United States Patent [19]

Creutzmann et al.

[11] Patent Number: 4,780,731

[45] Date of Patent: Oct. 25, 1988

[54] ELECTROPHOTOGRAPHIC PRINTER COMPRISING AN EXPOSURE ENERGY CORRECTING MEANS FOR THE OPTICAL CHARACTER GENERATOR

[75] Inventors: Edmund Creutzmann; Manfred Maier, both of Munich, Fed. Rep. of Germany

[73] Assignee: Siemens Aktiengesellschaft, Berlin and Munich, Fed. Rep. of Germany

[21] Appl. No.: 55,893

[22] PCT Filed: Sep. 18, 1986

[86] PCT No.: PCT/DE86/00378

§ 371 Date: May 26, 1987

§ 102(e) Date: May 26, 1987

[87] PCT Pub. No.: WO87/02162

PCT Pub. Date: Apr. 9, 1987

[30] Foreign Application Priority Data

Sep. 26, 1985 [DE] Fed. Rep. of Germany ....... 3534338

[51] Int. Cl.$^4$ .............................................. G01D 9/42
[52] U.S. Cl. .................... 346/108; 346/107 R; 346/160; 372/29; 358/296
[58] Field of Search ................ 346/108, 107 R, 76 L, 346/160, 154; 358/296, 300, 302; 372/29, 30, 31, 33

[56] References Cited

U.S. PATENT DOCUMENTS

| | | | |
|---|---|---|---|
| 3,832,488 | 8/1974 | Fahey et al. | 346/107 R |
| 3,850,517 | 11/1974 | Stephany et al. | 354/12 |
| 3,988,742 | 10/1976 | Meier et al. | 346/107 |
| 4,435,064 | 3/1984 | Tsukada et al. | 355/1 |
| 4,455,562 | 6/1984 | Dolan et al. | 346/154 |
| 4,549,190 | 10/1985 | Ohara | 346/108 |
| 4,596,995 | 6/1986 | Yamakawa et al. | 346/160 |

FOREIGN PATENT DOCUMENTS 2104266 3/1983 United Kingdom .

*Primary Examiner*—E. A. Goldberg
*Assistant Examiner*—Mark Reinhart
*Attorney, Agent, or Firm*—Hill, Van Santen, Steadman & Simpson

[57] ABSTRACT

An electrophotographic printer having an optical character generator and an exposure energy correcting means formed of a light-emitting diode strip for the optical character generator. Upon call-in of a balancing routing, an automatic balancing of the light-emitting elements occurs by use of a photoelement which acquires a radiant intensity transmitted onto the recording medium by every light-emitting element under prescribed normal operating conditions, and which supplies corresponding signals to a control means coupled to the light-emitting element. The control means then assigns every light-emitting element an individual actuation time and stores this in a switching time memory. Upon actuation, every light-emitting element thus supplies the same radiant energy to the recording medium.

19 Claims, 3 Drawing Sheets

ELECTROPHOTOGRAPHIC PRINTER COMPRISING AN EXPOSURE ENERGY CORRECTING MEANS FOR THE OPTICAL CHARACTER GENERATOR

BACKGROUND OF THE INVENTION

1. Field of the Invention

The invention is directed to a non-mechanical printer means, and particularly to an electrophotographic printer means wherein an image is generated on a recording medium from individual points by use of a plurality of light-emitting elements of an optical character generator.

2. Description of the Prior Art

Printer means operating on the principle of electrophotography contain optical character generators. These optical character generators have the job of converting the print information existing in the form of electronic data into an optical image with which a photoconductive layer, for example a photoconductor drum, is then exposed. The exposed image is then developed in a known way and, for example, transferred onto paper.

Optical character generators that are constructed in line-like fashion are advantageous since these operate without mechanical movement. Given this type of character generation, a separate light source must be present for every point which is to be imaged within a line. The number of light sources is thereby extremely high (several 1000). All light sources must expose the photoconductive layer with the same light energy so that an optimum quality of the print image is achieved. Light-emitting diodes are preferably utilized as light sources. These have the disadvantageous property that the light yield of the individual light-emitting diodes fluctuates greatly. In order to meet high quality demands, the individual light-emitting diodes must be corrected in a suitable way, i.e. must be individually driven, so that the emitted light energy per exposure point is approximately the same, even given differing light yield.

Such correction methods are notoriously known. Thus, German Published application No. 32 30 226 corresponding to U.S. Pat. No. 4,455,562, incorporated herein by reference, discloses a method and an apparatus for the control of a light-emitting diode field in a non-contacting printer, for example an electrophotographic printer, wherein the light-emitter diodes are employed for generating an image on a photoconductor.

Every individual light-emitting diode is thus previously balanced once before placing the printer means into operation and is digitally stored in stages in a read-only memory (PROM).

Further, German Published Application No. 34 22 907, corresponding to U.S. Pat. No. 4,596,995, incorporated herein by reference, discloses a dot matrix printer. The dot matrix printer has a light-emitting diode arrangement print head comprising an arrangement of light-emitting diodes, driver stages for independent operation of the light-emitting diodes, and time control circuits for the control of the turn-on times or of the turn-off times of the light-emitting diodes on the basis of the drive of the driver stages in accordance with the image data and correction data which are stored in a memory. The light-emitting diodes can be divided into blocks which can be successively driven. Deviations of mechanical and electrical properties of the light-emitting diodes are thus corrected, so that the generation of an image having high resolution and of a half-tone image is possible.

Here too, only the correction of the manufacturing related fluctuations of the light hield of the light-emitting diodes is provided.

The light yield of light-emitting diodes, however, does not fluctuate only during manufacture but also additionally changes in an unpredictable way given increasing aging. Added thereto is a high temperature dependency of the light power.

If character generators comprising light-emitting diodes are to be utilized in high-performance electrophotographic printer means which, for example, print between 50 and 140 sheets per minute, then a one-time balancing in the manufacture of the printer means is inadequate.

SUMMARY OF THE INVENTION

It is therefore an object of the invention to offer an exposure correcting means for the optical character generator in a non-mechanical printer means of the type initially cited which acquires different exposure intensities of the individual light sources and corrects or balances them in a suitable way. This correction procedure must be repeatable in selectable time segments over the entire useful life of the apparatus, and must be capable of sequencing automatically.

Given a non-mechanical printer means of the type initially cited, this object is achieved in that a correction means is provided for adjusting a turn-on time of the light-emitting elements and wherein the correction means has photoelement means positioned for acquiring radiant intensity transmitted onto the recording medium by at least some of the light-emitting elements, or by separate monitoring light-emitting elements. The photoelement means supplies a corresponding signal to a control means connected to the light-emitting elements, the control means then controlling the light-emitting elements so that a same radiant energy is directed towards the recording medium by the light-emitting elements which form the optical characters.

In accordance with the invention, an automatic balancing of the light-emitting elements ensues upon call-in of a balancing routine by, for example, the printer control. This occurs such that a photoelement acquires the radiant intensity transmitted onto the recording medium by every light-emitting element under prescribed, normal operating conditions and supplies it to a control means coupled to the light-emitting diodes in the form of electrical signals. The control means stores the signals allocated to the various radiant intensities of the individual light-emitting diodes in a memory and links or combines them with turn-on times to be individually defined such that the same radiation energy always impinges the recording medium for the representation of the individual picture elements.

As a measuring instrument for measuring the radiant intensity of the individual light-emitting diodes, a photoelement is employed which is either moved across the light-emitting diode strip including the allocated optics with an electromotive means, or which, on the other hand, is composed of a large-area photoelement which covers all light-emitting elements during the measuring event.

Since the radiant intensity impinging the recording medium is measured in the immediate proximity of the recording medium, all influences of the transmission channel including, for example, the self-focusing optics which is provided, are also taken into consideration.

In a further embodiment of the invention, the optical character generator comprises a plurality of monitoring light-emitting elemetns which do not serve the purpose of character generation and whose radiant intensity seemingly transmitted onto the recording medium is acquired via a photo element under prescribed normal operating conditions. A control means then acquires the stored actuation time of the individual light-emitting elements in accordance with a defined modification of the radiant intensity. The monitoring light-emitting elements are thus statistically actuated in the same fashion as the light-emitting elements themselves. They are actuated by means of simple combination with the other light-emitting elements.

As a result of the provision of such additional monitoring light-emitting elements, a modification of the luminescent power of the light-emitting elements can be continuously monitored without the photoelement having to be brought into the beam path of each and every individual light-emitting element via an electromotive means for this purpose. Monitoring by modifying the luminous intensity thus becomes particularly simple. This suffices for all applications while not making excessively high demands of the monitoring reliability.

DESCRIPTION OF THE PREFERRED EMBODIMENTS

Figure 1:
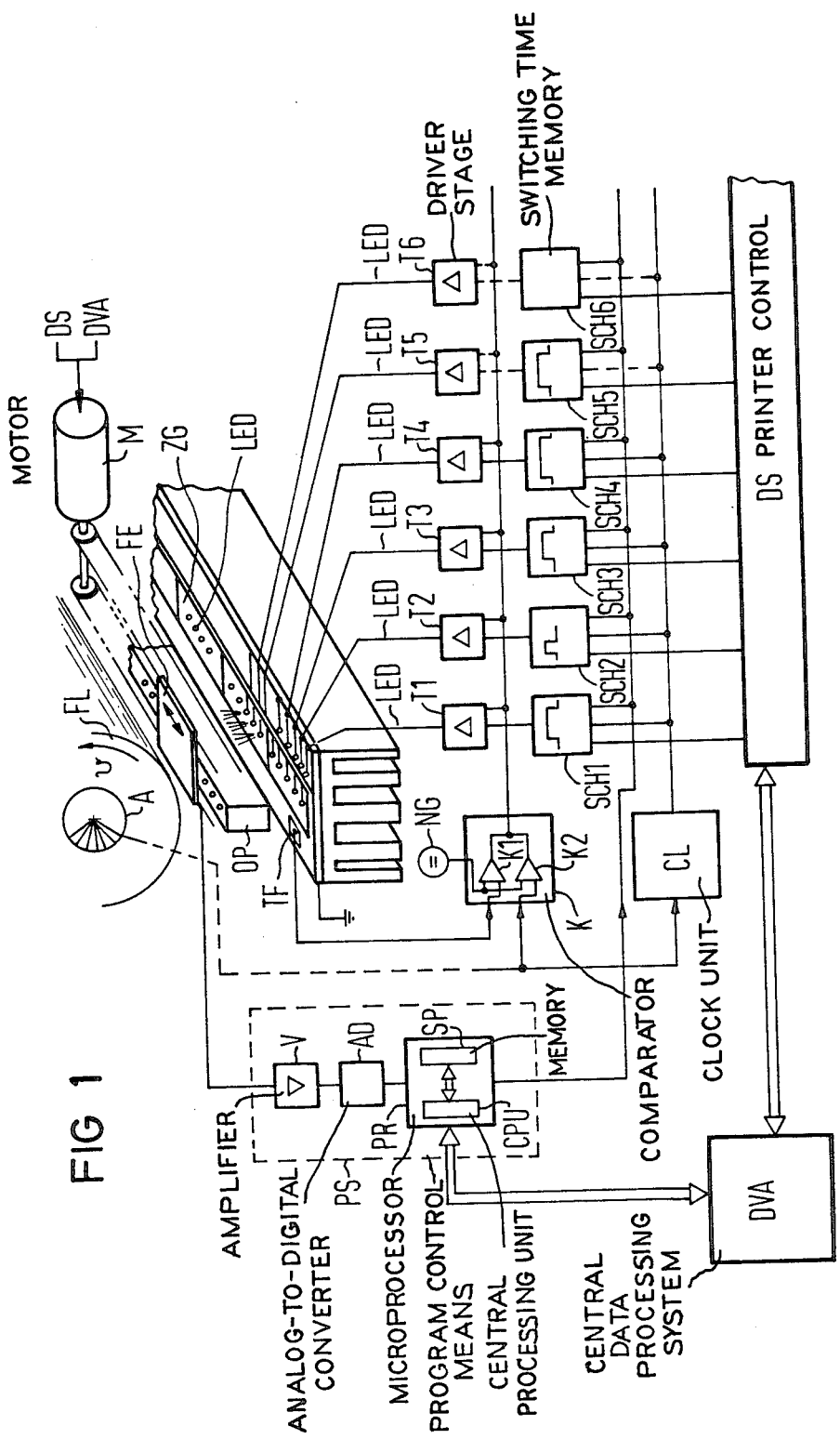
FIG. 1 illustrates a schematic illustration in the form of a block circuit diagram of an exposure correcting means in an electrophotographic printer means comprising an electromotively moved photoelement.

An optical character generator which is constructed in line-like fashion, and which comprises a plurality of individually excitable light-emitting diodes, is arranged in a printer operating on the electrophotographic principle, this printer not being shown in detail here. As disclosed, for example, in U.S. Pat. No. 4,596,995, image characters are generated in a known way on a photoconductive drum FL rotating with the speed v, and are generated on a photo-conductive layer of the photoconductive drum FL via a self-focusing optics OP by exciting the individual light-emitting diodes LED of the character generator ZG. These image characters are then developed in a developing station in a way not shown here and are transferred onto continuous form paper in a transfer station. The text to be represented is thereby supplied to the printer control DS from a central data processing system DVA.

The image characters composed of individual points are generated line-by-line on the photoconductive drum by exciting the LEDs of the character generator. They are generated since the ray beam emanating from the individual LEDs and focused by the optics OP discharges the pre-charged surface of the photoconductive drum point-by-point and thus elicits a charge image which corresponds to the character image to be represented.

A minimum radiation energy of the LEDs, and thus a minimum actuation time (on time) of the LEDs is required for generating a character point. Since the photoconductive drum rotates continuously during print operation, the finite actuation time of the LEDs leads to an oval deformation of a circular picture element. The shaping degree of the individual picture element which can still be tolerated for generating a clear print image thus limits, among other things, the rotational speed of the photoconductive drum. When the time proportional to the minimum spacing between the two write lines (microlines) given a maximum possible printing speed (rotational speed of the drum) is referred to as T, then the required actuation time of the LEDs ranges between $\frac{1}{4}$ and $\frac{1}{2}$ T. The print image on the photoconductive drum FL can thus be generated both positively as well as negatively. This means that a character point can be generated either by switching the light-emitting diodes on or by switching the light-emitting diodes off. The term "actuation time" used below is thus used both for the turn-on time as well as for the turn-off time.

It has now turned out that the light power emitted by a LED is dependent not only on the electrical drive values of current and voltage but is also dependent on the aging condition of the LEDs and on the operating temperature. The light power of the individual LEDs thus fluctuates considerably in comparison to one another. In order to be able to compensate this differing light power of the individual LEDs in the character generator ZG, the printer means has a correction means.

The correction means thus contains a photoconductive element FE which is arranged following the focusing optics OP in the proximity of the surface of the photoconductive drum. This photoelement FE is coupled to an electric motor M which, upon call-in of a balancing routine, for example via the printer control DS or via the central data processing system DVA, moves the photoelement FE across the focusing optics OP line-by-line. At the same time, the individual light-emitting diodes LED of the character generator ZG are excited via the central printer control DS. The light power emanating from the individual light-emitting diodes—taking the overall transmission path including the focusing optics OP into consideration—generates a corresponding electrical signal at the output of the photoelement FE. This electrical signal is supplied to a program-controlled means PS that is coupled to the photoelement FE. The program-controlled means contains an amplifier V with a following analog-to-digital converter AD for converting the analog signal corresponding to the light energy into a digital signal. A microprocessor PR which, for example, can contain a Siemens module 8080, contains a central processing unit CPU having an allocated memory unit SP. Via the central processing unit CPU, the microprocessor PR acquires the signals corresponding to the radiant intensity of the LEDs and stores them in the memory SP in the sequence of their sampling. By allocating an actuation time adapted to the individual radiant intensities of the individual LEDs, a uniform radiant energy that is the same for all LEDs can be generated from the radiant intensity of the individual LEDs measured in this way. For this purpose, the microprocessor PR assigns individual actuation times to the individual powers of the LEDs stored in the memory and stores this actuation time in the switching time memories SCH1 through SCHn allocated to the printer control DS and are individually wired to the LEDs. The switching time memories SCH1 through SCHn can also be part of a shared, larger memory.

The correction means further comprises a compensation arrangement K which acquires the operating parameters of the printer means, for example speed v of the recording medium FL or operating temperature TF of the light-emitting elements LED. These parameters are acquired via corresponding sensor elements and, dependent thereon, the correction means uniformly defines the electrical standard operating parameters of voltage and current for all light-emitting elements LED and supplies these to the LEDs via driver stages T1 through Tn. For acquiring the speed v of the photoconductive drum FL, a sensor means A fashioned in a known way is situated at the photoconductive drum FL and, for acquiring the temperature, a temperature sensor element TF is situated on the carrier accepting the LEDs. Both the sensor A as well as the temperature sensing element TF supply a voltage corresponding to the measured quantities to the compensation arrangement. This voltage is compared to a variable normal dc voltage NG externally supplied to the comparators K1 and K2 and, dependent on this comparison event, then determines the drive current or the drive voltage for the driver stages T1 through Tn. The compensation arrangement K can also be separately set, for example, by variation of the norm dc voltage NG independently of the operating parameters thereof. The sensing signal proportional to the rotational speed v supplied from the sensor is also simultaneously supplied to a clock means CL. In combination with a clock signal supplied from this clock means CL, the central printer control DS controls the LEDs of the character generator ZG microline-by-microline.

Figure 2:
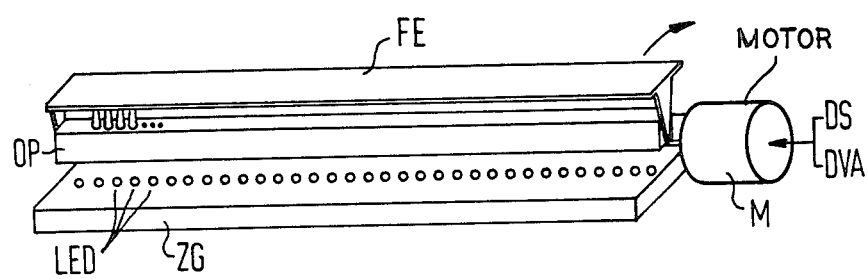
FIG. 2 illustrates a schematic illustration of an optical character generator wherein the photoelement required for the exposure correction is fashioned in swivelable fashion.

Instead of a single photoelement FE moved via a motor M and covering about three fibers of the focusing optics OP, it is also possible in accordance with the illustration of FIG. 2 to design the photoelement of such size that it covers the entire width of the focusing optics OP, and thus of the character generator ZG. The photoelement FE can thus be swivelable secured to the focusing optics OP or to the character generator ZG, and is then pivoted into the beam path of the light-emitting diodes LED with the assistance of an electric motor M or of an electromagnet, and is pivoted upon call-in of a sampling routine.

Figure 3:
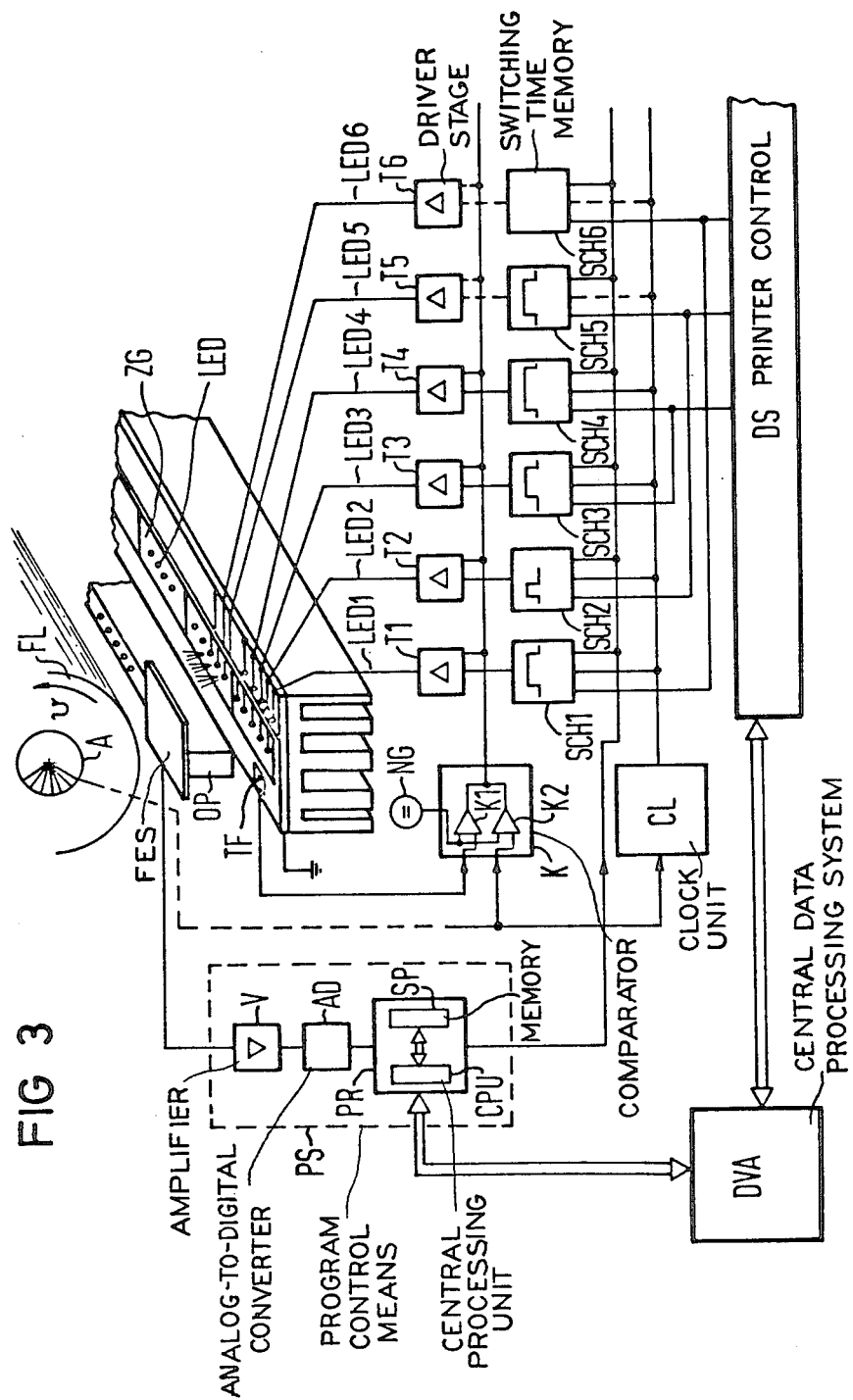
FIG. 3 shows a schematic illustration of a block circuit diagram of an exposure energy correcting means in anelectrophotographic printer means wherein additional monitoring light-emitting elements are sampled via a stationarily arranged photoelement.

Furthermore, it is also possible given an embodiment of the correction means in accordance with FIG. 3, to arrange a plurality of monitoring light-emitting elements on the carrier of the character generator ZG. These monitoring light-emitting elements do not serve the purpose of character generation. These additional light-emitting diodes LED1 through LED3, for example, are continuously sampled by a stationary photoelement FES or are likewise sampled only upon call-in of a balancing routine. The radiant intensity seemingly transmitted onto the recording medium FL is thereby acquired under prescribed normal operating conditions. The additional, monitoring light-emitting diodes LED1 through LED3 are driven via the central printer control DS by appropriate wiring in parallel to the light-emitting elements LED4 through LED6 which actually generate characters on the photoconductive drum FL. These monitoring light-emitting diodes LED1 through LED3 are thus subject to the same operating conditions as the other light-emitting diodes LED4 through LED6. Viewed statistically, thus they are subject to the same aging process. In the exemplary embodiment shown in FIG. 3, however, it is necessary to balance the light-emitting diode strip in the character generator ZG before integration in view of the light power, and thus to store the corresponding actuation times in the switching time memories SCH1 through SCHn (for LED1 through LEDn). The later adaptation of the actuation times during operation of the printer means can ensue by sampling themonitoring light-emitting elements LED1 through LED3.

Although various minor changes and modifications might be proposed by those skilled in the art, it will be understood that we wish to include within the claims of the patent warrented hereon all such changes and modifications as reasonably come within our contribution to the art.

We claim:
1. A non-mechanical printer means, comprising:
   image generating means for generating an image formed of individual points on a recording medium by use of a plurality of light-emitting elements of an optical character generator;
   a correction means for automatically balancing the light-emitting elements by controlling a turn-on time of the light-emitting elements by calling in an individually correctable actuation time from a switching time memory means;
   said correction means including photoelement means positioned for acquiring radiant intensity transmitted onto the recording medium by every light-emitting element given prescribed normal operation conditions and for supplying corresponding signals for each light-emitting element to a control means connected to control the light-emitting elements through said switching time memory means;
   said control means allocating an individual activation time to each and every light-emitting element and storing the activation time in said switching time memory means for individually controlling each connected light-emitting element so that a same radiant energy is directed towards the recording medium by all light-emitting elements; and
   a compensation means connected to all light-emitting elements for acquiring operating parameters of the image generating means and uniformly defining a common electrical opeating parameter for all light-emitting elements based upon said operating parameters.

2. A non-mechanical printer means according to claim 1 wherein said photoelement means is coupled to an electromotive means which moves said photoelement means into a radiation path of the light-emitting elements as needed.

3. A non-mechanical printer means according to claim 1 wherein said photoelement means has a relatively small-area as compared to an area covered by all light-emitting elements and is moved successively through a radiation path of all of the light-emitting elements via an electromotive means.

4. A non-mechanical printer means according to claim 1 wherein said photoelement means has an area sufficiently large to acquire radiation from all light-emitting elements simultaneously.

5. A non-mechanical printer means according to claim 4 wherein means are provided for mounting said photoelement means such that it is swivelable into and out of position for receiving radiation.

6. A non-mechanical printer means according to claim 1 wherein said operating parameters acquired by the compensation means are speed of the recording medium and operating temperature of the light-emitting elements.

7. A non-mechanical printer means according to claim 1 wherein said operating parameters acquired by the compensation means include at least one of the parameters speed of the recording medium and operating temperature of the light-emitting elements.

8. A non-mechanical printer means according to claim 7 wherein the optical character generator has a temperature sensing means coupled thereto, an output of the tempeature sensing means being connected to said compensation means.

9. A non-mechanical printer means according to claim 1 wherein said correction means comprises a photoelement arranged behind a focusing optics and means for moving the photoelement through a region of radiation of the light emitting elements;
said control means comprising an allocated memory means for storing said acquired radiant intensities of the light-emitting elements, said control means assigning an actuation time to each radiant intensity of each of the light-emitting elements and for depositing this actuation time in said switching time memory means;
driver means for driving the light-emitting elements connected to the switching time memory means; and
said compensation means acquiring at least one of the operating parameters operating temperature of the printer means and speed of the recording medium.

10. A non-mechanical printer means according to claim 1 wherein said printer means comprises an electrophotographic printer means.

11. A non-mechanical printer means, comprising:
a plurality of light-emitting elements arranged to form characters by radiating light onto a photoconductive surface;
each light-emitting element being connected to a switching time memory means for storing a switching time determining an amount of time by which each of the light-emitting elements is individually activated;
printer control means connected to each of the switching time memory means for activating the various light-emitting elements to create characters;
photoconductive means for sensing a light intensity from at least some of the light-emitting elements and for outputting corresponding signals;
said corresponding signals being connected to a control means for assigning individual actuation times to each of said corresponding signals corresponding to light radiating from said at least some light-emitting elements and for depositing the individual actuation times in each respective switching time memory means; and
a compensation means connected in common to the light-emitting elements for acquiring operating parameters of the image generating means and uniformly defining a common electrical operating parameter for the light-emitting elements based upon said operating parameters.

12. A non-mechanical printer means according to claim 11 wherein said control means includes means for storing said corresponding signals in sequence of sampling.

13. A non-mechanical printer means according to claim 11 wherein said photoconductive means comprises a photoelement which is mechanically moved so as to scan all radiant intensities from all light-emitting diodes of the non-mechanical printer means.

14. A non-mechanical printer means according to claim 11 wherein said photoconductive means has an area sufficient to receive radiant intensity from all light-emitting elements simultaneously.

15. A non-mechanical printer means according to claim 11 wherein said photoconductive means receives light radiation from all light-emitting elements.

16. A non-mechanical printer means, comprising:
means for generating an image formed of individual points on a recording medium by use of a plurality of light-emitting elements of an optical character generator;
a correction means for automatically balancing the light-emitting elements by controlling a turn-on time of the light-emitting elements and calling in an individually correctable actuation time from a switching time memory means;
additional monitoring light-emitting elements being provided which are not employed for character formation;
photoelement means positioned for acquiring radiant intensity transmitted from said monitoring light-emitting elements given prescribed normal operating conditions and for supplying corresponding signals to a control means connected to control the light-emitting elements through said switching time memory means;
said control means allocating an individual activation time to every light-emitting element and storing the activation time in said switching time memory means for controlling a connected light-emitter element so that a same radiant energy is directed towards the recording medium; and
said monitoring light-emitting elements being connected in parallel to at least some of said light-emitting elements employed for forming characters such that they are driven in common by a printer control means.

17. A non-mechanical printer means according to claim 16 wherein said printer control means statistically actuates the monitoring light-emitting elements in a same pattern as the light-emitting elements for character generation.

18. A non-mechanical printer means according to claim 16 wherein said monitoring light-emitting elements are arranged on a common carrier element together with the light-emitting elements for character generation.

19. A non-mechanical printer means, comprising:
a plurality of character generating light-emitting elements;
a plurality of monitoring light-emitting elements;
the character and monitoring light-emitting elements each connecting to respective switching time memory means for storing an actuation time;
all of the switching time memory means associated with the character generating light-emitting elements connecting to a printer control means for actuating the character-generator light-emitting elements for character generation;

the monitoring light-emitting elements being commonly connected to respective ones of said character generating switching time memories at said printer control means;

a photoconductive drum arranged to receive radiant light from said character generating light-emitting elements;

a photoconductive element arranged to receive radiant light from said monitoring light-emitting elements; and a control means connected to said photoelement for storing signals corresponding to the amount of radiant light received from the monitoring light-emitting elements and for assigning actuation times to said signals, and for forwarding said actuation times to said switching time memory means associated with said monitoring light-emitting elements and said character generating light-emitting elements.

* * * * *